UNITED STATES PATENT OFFICE.

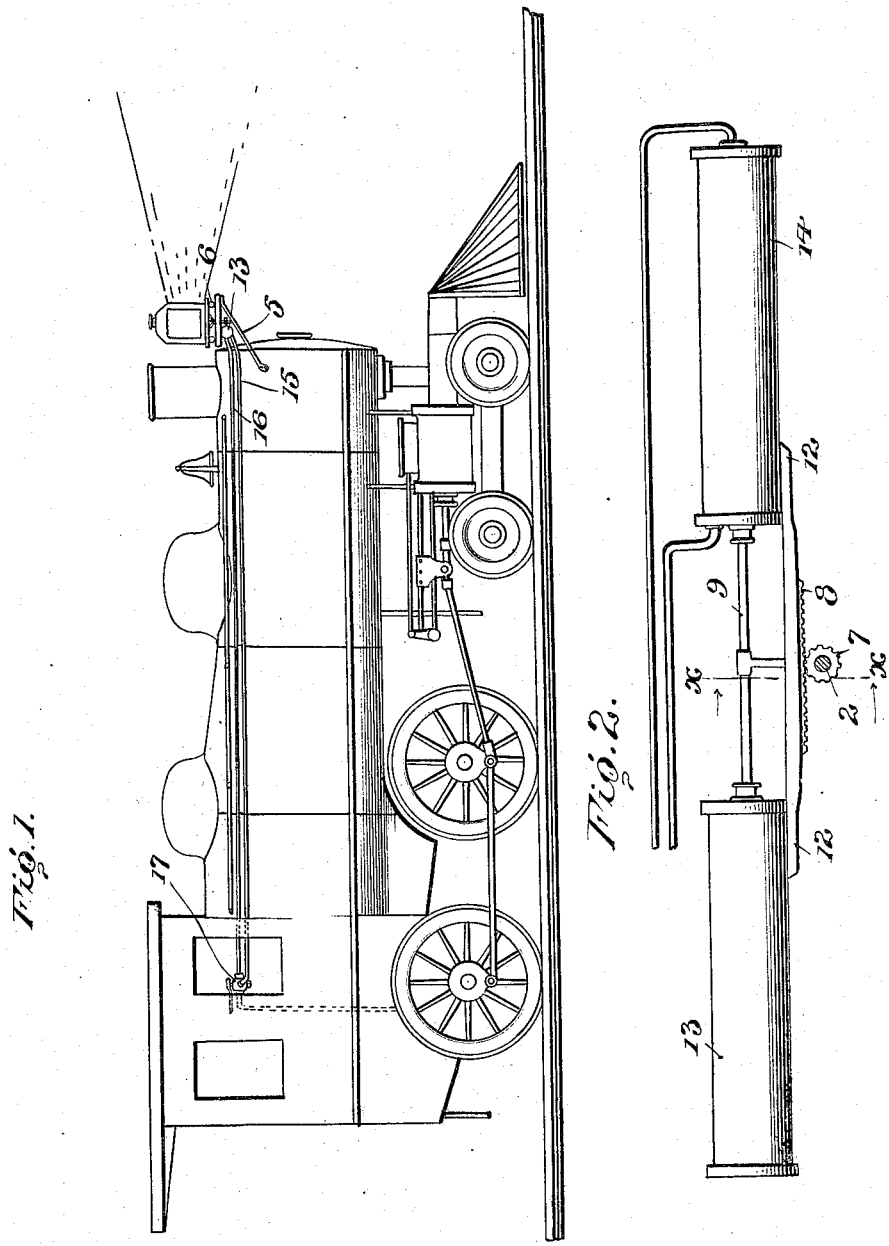

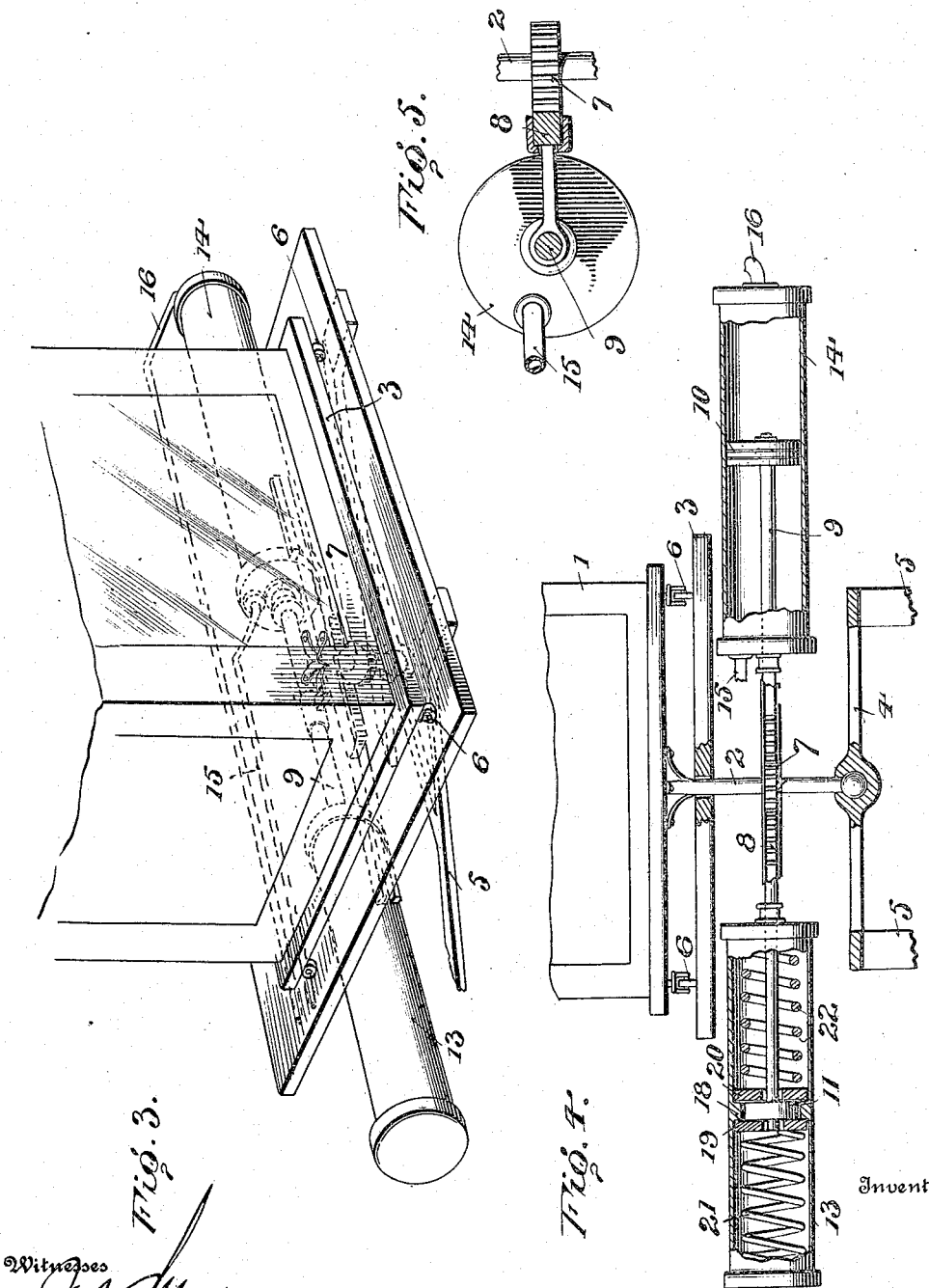

EDWARD C. KING, OF CHARLOTTESVILLE, VIRGINIA.

HEADLIGHT-OPERATING MEANS.

No. 924,557.

Specification of Letters Patent.

Patented June 8, 1909.

Application filed November 25, 1908. Serial No. 464,411.

*To all whom it may concern:*

Be it known that I, EDWARD C. KING, citizen of the United States, residing at Charlottesville, in the county of Albemarle and State of Virginia, have invented certain new and useful Improvements in Headlight-Operating Means, of which the following is a specification.

The present invention is designed to equip locomotive engines, automobiles and the like with headlights and actuating means therefor whereby the rays of light may be thrown straight ahead or in the direction of the prescribed course, so that the way may be lighted when rounding curves or turning corners and whereby in the case of locomotives the light may be thrown so as not to shed the rays along the track and thereby cause confusion.

The invention contemplates a motor cylinder, means for controlling a supply of motive medium thereto, a compensator for normally maintaining the light in a given position or straight ahead, and novel and peculiar mountings and connections for the headlight.

While the invention may be adapted to different forms and conditions by changes in the structure and minor details without departing from the spirit or essential features thereof, still the preferred embodiment of the invention is shown in the accompanying drawings.

For a full understanding of the invention and the merits thereof and also to acquire a knowledge of the details of construction of the means for effecting the result, reference is to be had to the following description and accompanying drawings, in which:

Figure 1 is a side view of a locomotive engine provided with a headlight embodying the invention. Fig. 2 is a top plan view of the compensator and motive cylinder showing the connecting rod and rack bar and the shaft to which the headlight is connected, said shaft being in section. Fig. 3 is a perspective view of the headlight, its mountings and operating means. Fig. 4 is a sectional view of the parts illustrated in Fig. 3, the upper portion of the headlight being broken away. Fig. 5 is a view on the line $x$—$x$ of Fig. 2 looking in the direction of the arrow.

Corresponding and like parts are referred to in the following description and indicated in all the views of the drawings by the same reference characters.

The headlight 1 may be of any design and is mounted to turn about a vertical axis and is provided with a shaft 2 pendent from its base and mounted in a platform 3 and in a cross piece 4 joining braces 5 by means of which the platform 3 is supported at its outer end. Anti-friction devices, as rollers 6 are interposed between the base of the headlight and the platform 3 to reduce the friction to the smallest amount possible. A pinion 7 fast to the shaft 2 is in mesh with a rack bar 8 connected to move with a rod 9 which is provided at one end with a piston 10 and at its opposite end with a head 11. The rack bar 8 has its end portions mounted in guides 12 provided at the inner or opposing ends of longitudinally alined cylinders 13 and 14. The cylinder 14 which is a motor cylinder has its opposite ends connected by means of pipes 15 and 16 with a suitably constructed valve 17 conveniently located to be easily operated to control the supply of motive medium to the cylinder 14 and to exhaust the spent motive medium therefrom in the manner well understood. As indicated in Fig. 1 the valve 17 is located within the cab of a locomotive engine and may have connection with the boiler, train pipe or compressed air reservoir, according to the nature of the motive medium employed for moving the piston 10 in the cylinder 14. The cylinder 13 is provided midway of its ends with an annular stop 18 and receives washers 19 and 20 and springs 21 and 22, the latter being confined between the heads of the cylinder and the respective washers 19 and 20.

The cylinder 13 and adjunctive parts constitute in effect a compensator whose purpose is to prevent shock when the headlight is returned to normal position and which compensator also acts as a means for returning the headlight to a given position when the valve 17 is turned to exhaust the motive medium from the end of the cylinder into which it was last admitted for operating the piston to turn the headlight in the proper direction through the instrumentality of the rack bar 8 and pinion 7. Under normal conditions the piston 10 occupies a central position within the motor cylinder 14 and the head 11 occupies a like position within the cylinder 13 of the compensator.

When the valve 17 is operated to admit motive medium of the pipe 15 into the left-hand end of the cylinder 14 the piston 10 is moved to the right thereby compressing the spring 22 and causing the headlight to turn in one direction. Upon moving the valve 17 to exhaust the motive medium from the left-hand end of the cylinder 14 the spring 22 expands and moves the head 11 and piston 10 to normal position thereby returning the headlight to a given position, that is, with the rays of light shed straight ahead. Upon admitting the motive medium through the pipe 16 into the right-hand end of the motive cylinder 14 the piston 10 is moved to the left and the spring 21 is compressed, and when relieving the right-hand end of the cylinder 14 from pressure by means of the valve 17 the spring 21 expanding returns to the normal position.

The washers 19 and 20 are limited in their movement toward each other by means of the annular stop 18, hence either spring may be compressed without the other spring following. The head 11 is approximately of a thickness corresponding to the length of the annular stop 18, or the distance between the washers 19 and 20 whereby the piston is held in a given position by the action of the springs 21 and 22 and the washers 19 and 20 upon opposite sides of said head 11 and in engagement with opposite ends of the annular stop 18. The openings in the washers 19 and 20 are of a size to snugly fit the rod 9 and the washers themselves closely fit the cylinder 13, hence the washers form guides for the inner end of the head 11 thereby directing the latter into the space circumscribed by the annular stop 18 and preventing said head 11 catching upon either end of the annular stop 18. By operating the valve 17 either to the right or to the left, the headlight may be turned in the required direction so as to shed rays of light along the prescribed course whether rounding a curve or turning a corner, according to the adaptation of the invention.

Having thus described the invention what I claim as new is:

1. In combination a headlight mounted to turn about a vertical axis, a motor cylinder, means for admitting motive medium into either end of the motor cylinder, a piston arranged to operate in the motor cylinder, a compensator comprising oppositely acting springs, a rod connecting said piston with the compensator and connecting means between said rod and the headlight for positively moving the latter.

2. In combination, a headlight mounted to turn about a vertical axis, coöperating longitudinally alined cylinders, a rod arranged to operate in said cylinders and provided at one end with a piston and at the opposite end with a head, means for supplying motive medium to either end of the cylinder receiving said piston, springs located in the other cylinder and arranged to act upon opposite sides of said head and actuating means between the said head and the headlight to move the latter in the required direction.

3. In combination a headlight, a rod having connection with the headlight to turn the same, a motor cylinder receiving the end of said rod, a piston fast to the end of the rod and arranged to operate within said motor cylinder, a second cylinder receiving the opposite end of said rod and provided intermediate of its ends with an annular stop, a head fast to the inner end of the rod arranged within said second cylinder, springs arranged upon opposite sides of said head and in opposite end portions of the second cylinder, and washers located upon opposite sides of said inner stop and sustaining the inner end thrust of the springs, said washers adapted to be engaged by a head and movable therewith to compress the spring in engagement with the movable washers.

4. In combination a head light, a rack and pinion connection coöperating with said headlight to turn the same about a vertical axis, a rod connected with said rack bar, a compensator coöperating with said rod and comprising oppositely acting springs, a motor cylinder, a piston arranged to operate in the motor cylinder and having connection with the said rod, and means for admitting motive medium into opposite ends of the motor cylinder.

In testimony whereof I affix my signature in presence of two witnesses.

EDWARD C. KING. [L. S.]

Witnesses:
J. A. GANZERT,
C. T. HARN.